United States Patent [19]

Bier et al.

[11] 4,223,125

[45] Sep. 16, 1980

[54] POLYESTER COMPOSITIONS WHICH CRYSTALLIZE RAPIDLY

[75] Inventors: Peter Bier, New Martinsville, W. Va.; Rudolf Binsack, Krefeld, Fed. Rep. of Germany

[73] Assignee: Bayer Aktiengesellschaft, Leverkusen, Fed. Rep. of Germany

[21] Appl. No.: 40,386

[22] Filed: May 18, 1979

Related U.S. Application Data

[63] Continuation-in-part of Ser. No. 875,015, Feb. 3, 1978, Continuation-in-part of Ser. No. 960,976, Nov. 15, 1978, abandoned, which is a continuation of Ser. No. 852,894, Nov. 18, 1977, abandoned.

[30] Foreign Application Priority Data

Feb. 14, 1977 [DE] Fed. Rep. of Germany ....... 2706128
Nov. 23, 1976 [DE] Fed. Rep. of Germany ....... 2653120

[51] Int. Cl.² ............................................. C08G 63/18
[52] U.S. Cl. .................................. 528/305; 528/309; 264/239; 264/176 R
[58] Field of Search ...................... 528/302, 305, 309

[56] References Cited

U.S. PATENT DOCUMENTS

| | | | |
|---|---|---|---|
| 3,134,744 | 5/1964 | Starck et al. ............................ 544/25 |
| 3,368,995 | 2/1968 | Furukawa et al. ................ 260/40 R |
| 3,372,148 | 3/1968 | Wiener ................................. 528/473 |
| 3,516,957 | 6/1970 | Gray et al. ......................... 260/22 R |
| 3,565,852 | 2/1971 | Conix et al. ...................... 260/40 R |
| 3,576,774 | 4/1971 | Myers et al. ...................... 260/22 R |
| 3,644,267 | 2/1972 | Jackson et al. ................ 260/33.6 R |
| 3,673,139 | 6/1972 | Hrach ............................... 528/305 X |
| 3,692,744 | 9/1972 | Rich et al. .......................... 528/296 |
| 3,707,578 | 12/1972 | Vasta ............................... 528/309 X |
| 3,835,089 | 9/1974 | Fox .................................. 260/40 R |
| 3,843,615 | 10/1974 | Herwig et al. ...................... 525/444 |
| 3,892,821 | 7/1975 | Koleske et al. .................... 525/411 |
| 3,907,926 | 9/1975 | Brown et al. ................... 260/45.9 R |
| 3,966,671 | 6/1976 | Smith ................................. 260/40 R |
| 4,049,611 | 9/1977 | Hirzy .................................. 260/31.6 |
| 4,097,421 | 6/1978 | Chang ............................... 260/40 R |
| 4,125,572 | 11/1978 | Scott .................................... 528/307 |
| 4,135,009 | 1/1979 | Mercurio ............................ 427/195 |

FOREIGN PATENT DOCUMENTS

| | | |
|---|---|---|
| 2042447 | 4/1971 | Fed. Rep. of Germany . |
| 1104089 | 2/1968 | United Kingdom . |
| 1111012 | 4/1968 | United Kingdom . |
| 1224684 | 3/1971 | United Kingdom . |
| 1228966 | 4/1971 | United Kingdom . |
| 1340761 | 12/1973 | United Kingdom . |
| 2015013 | 9/1979 | United Kingdom . |
| 2015014 | 9/1979 | United Kingdom . |

*Primary Examiner*—Lucille M. Phynes
*Attorney, Agent, or Firm*—Lawrence S. Pope

[57] ABSTRACT

This invention relates to polyalkylene terephthalates which crystallize rapidly, and process of making such compositions and a process of using such compositions in injection molding. The compositions comprise polyalkylene terephthalates with intrinsic viscosities in excess of about 0.4 dl/g in 1:1 phenol/tetrachloroethane at 25° C. and at least about 0.5 wt. %, based on the weight of resin and additive, of an aromatic carboxylic acid ester. These compositions may be prepared by intimately mixing the ingredients, for example by extrusion. These compositions, particularly those wherein the polyester consists essentially of polyethylene terephthalate, may be injection molded with mold temperatures less than about 120° C. and still retain a significant degree of crystallinity even with short mold residence times.

21 Claims, No Drawings

POLYESTER COMPOSITIONS WHICH CRYSTALLIZE RAPIDLY

This application is a continuation-in-part of our co-pending applications Ser. No. 960,976 filed Nov. 15, 1978 now abandoned and Ser. No. 875,015 filed Feb. 3, 1978. Ser. No. 960,976 is in turn a continuation of application Ser. No. 852,894 filed Nov. 18, 1977 and now abandoned.

FIELD OF THE INVENTION

This invention relates to highly crystalline, rapidly crystallizing thermoplastic compound comprising a high molecular weight polyalkylene terephthalate and an aromatic acid ester, which causes the polyester to crystallize rapidly.

BACKGROUND OF THE INVENTION

Polyalkylene terephthalates are used for manufacturing fibers, films and molded articles. They have excellent physical properties such as high wear resistance, durability, and high dimensional accuracy due to their partly crystalline structure and they are, therefore, particularly suitable for the manufacture of heavy duty molded articles. The mechanical properties can be further improved by incorporating reinforcing materials such as glass fibers (British Pat. No. 1,111,012, U.S. Pat. No. 3,368,995 and German Auslegeschrift No. 2,042,447).

Polyethylene terephthalate (PET) is particularly suitable for the manufacture of fibers, filaments and sheets, but it is hardly suitable for injection molding because of high molding temperatures (approximately 140° C.) and relatively long molding times required. These stringent processing conditions prevent the use of polyethylene terephthalate for injection molding in spite of its high rigidity and heat distortion temperature. In particular, the high mold temperature required is beyond the equipment capabilities of many mold shops which have only water heated molds. Such molds are normally capable of temperatures no higher than about 110° C. Thus, wider use of this polymer is restricted not only by the economics of its long processing cycle but also by the inability of many potential end users to process the resin at all.

Although polypropylene terephthalate (PPT) and polybutylene terephthalate (PBT) require shorter molding times and lower molding temperatures (approximately 80° C.) owing to their higher rate of crystallization, they are inferior to polyethylene terephthalate in their physical properties, particularly in their heat distortion temperature.

High crystallinity ensures hardness, dimensional stability and resistance to distortion even at elevated temperatures. For optimum properties high crystallinity must be arrived at as rapidly as possible. Thus, in polyethylene terephthalate crystallization can be improved and accelerated by nucleation with finely divided inorganic solids (Netherlands Patent Application No. 65.11744). Generally the maximum degree of crystallinity obtainable for PET gives an energy of crystallization of about 14 cal/g and satisfactory mechanical properties are usually obtained when the crystallization energy is in excess of about 6 cal/g. The injection molding cycle time which governs the economics of the process depends on the time interval for which the cast must stay in the mold. To obtain a satisfactory degree of crystallization these cycles must be uneconomically long even at high molding temperatures and, therefore, prevent the wide use of polyethylene terephthalate in the manufacture of injection molded articles.

An object of the present invention is the provision of polyalkylene terephthalates compositions which have a higher crystallization velocity and higher crystallinity than those already known. A further object of the invention are polyalkylene terephthalates compositions which can be molded more rapidly and at lower temperatures than has been possible heretofor. An especial object is the provision of polyethylene terephthalates compositions (PET) which can be molded at temperatures below about 120° C. and still retain a high degree of crystallinity.

In such polyester compositions the degree of crystallinity required for high dimensional stability is achieved more rapidly so that the injection molding cycles are substantially shortened. Also, the molding temperature can be lower without impairing the crystallization behavior. The injection molded casts, therefore, cool more rapidly and the residence time in the mold is, therefore, also reduced.

SUMMARY OF THE INVENTION

The present invention provides rapidly crystallizing thermoplastic compositions comprising (1) a high molecular weight polyalkylene terephthalate having an intrinsic viscosity of at least about 0.4 dl/g, preferably at least about 0.8 dl/g (determined on an 0.5% by weight solution in a mixture of phenol and tetrachloroethane in proportions by weight of 1:1 at 25° C.), and (2) no less than about 0.5, preferably 1.0, and most preferably 4 weight %, and no more than about 30, preferably 15, most preferably 12 weight % based on the weight of 1 and 2, of an aromatic acid ester formed from an aromatic carboxylic acid with between 7 and 25 carbon atoms and alcohols selected from aliphatic, cycloaliphatic and araliphatic alcohols with between 1 and 20 carbon atoms, said ester being monomeric and free of substituents substantially reactive with said high molecular weight polyalkylene terephthalate under injection molding conditions.

The preferred aromatic acid esters correspond to the following Formula I:

$$\left[\left(\left(R_3\right)_z - \underset{}{\bigcirc} - \overset{O}{\underset{\|}{C}} - O\right)_y - R_2 - O - \overset{O}{\underset{\|}{C}}\right]_n \underset{}{\bigcirc}^{(R_3)_x} - (C - O - R_1)_m \qquad (I)$$

wherein $R_1$ denotes a linear or branched aliphatic, cycloaliphatic or araliphatic monovalent radical with between 1 and 20 carbon atoms, preferably a branched chain aliphatic radical having 3 to 12 carbon atoms, $R_2$ denotes the linear or branched aliphatic, cycloaliphatic or araliphatic hydroxy free residue of an at least dihydroxy alcohol with between 2 and 20 carbon atoms, $R_3$ denotes a monovalent substituent substantially unreactive with high molecular weight polyalkylene terephthalate under injection molding conditions, m is an integer of between 0 and 3, inclusive, preferably 2 or 3, n is 1 when m is 0 and otherwise 0, y is an integer of at least 1, preferably an integer between 1 and 3 inclusive, x is an integer of between 0 and 5 inclusive selected such that neither x+n nor x+m exceed 6, and z is an integer of between 0 and 5 inclusive.

Particularly preferred are aromatic acid esters of the Formula II:

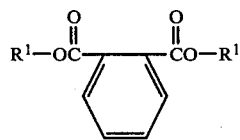

(II)

wherein
$R^1$ represents a branched chain aliphatic group having 3–12 C atoms.

The present invention also provides a process for the production of rapidly crystallizing thermoplastic compounds, wherein from about 70 to 99.5% by weight, preferably from about 85 to 99% by weight, and most preferably about 88 to 96% by weight of a high molecular weight polyalkylene terephthalate having an intrinsic viscosity of at least 0.4 dl/g, preferably at least about 0.8 dl/g (determined on an 0.5% by weight solution in a mixture of phenol and tetrachloroethane in proportions by weight of 1:1 at 25° C.) and from about 0.5 to 30% by weight, preferably from about 1 to 15% by weight, and most preferably about 4 to 12% by weight of an aromatic acid ester are mixed together and homogenized in the melt. The operation can be carried out in a mixing screw extruder, for example; the solidified melt can subsequently be granulated.

The present invention also provides a method of injection molding polyethylene terephthalate at mold temperatures of about 120° C. or less to produce highly crystalline articles, preferably articles in which the molded composition has an energy of crystallization of about 6 cal/g or greater by incorporating between about 0.5 and 30, preferably 1 and 15, most preferably 4 and 12 weight % of an aromatic acid ester into said polymer.

DETAILED DESCRIPTION OF THE INVENTION

The dicarboxylic acid component of the polyalkylene terephthalate (1) consists of terephthalic acid which may contain up to 10 mol %, based on the acid component of other aromatic dicarboxylic acids having from 6 to 14 C atoms, of aliphatic dicarboxylic acids having from 4 to 8 C atoms or of cycloaliphatic dicarboxylic acids having from 8 to 12 C atoms. Examples of such dicarboxylic acids to be included with terephthalic acid are phthalic acid, isophthalic acid, naphthalene-2,6-dicarboxylic acid, diphenyl-4,4'-dicarboxylic acid, adipic acid, sebacic acid, and cyclohexanediacetic acid.

The preferred diol component of the polyalkylene terephthalate is a diol from 1 to 12 carbon atoms for example, propane-1,3-diol, butane-1,4-diol, pentane-1,5-diol, hexane-1,6-diol or cyclohexane-1,4-dimethanol and, preferably, ethylene glycol; it may contain up to 10 mol % of other aliphatic diols having from 3 to 8 C atoms, cycloaliphatic diols having from 6 to 15 C atoms or aromatic diols having from 6 to 21 C atoms. Examples of such additional diols ("Codiols") include 3-methylpentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane.

The polyalkylene terephthalates (1) can be branched by incorporating trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable not to use more than 1 mol % of branching agent, based on the quantity of acid component.

Polyalkylene terephthalates derived mainly from terephthalic acid and ethylene glycol are preferred and homoethylene terephthalate, i.e. a product produced substantially only from ethylene glycol and terephthalate acid or its esters, or its anhydride is most preferred.

The polyalkylene terephthalate can be prepared in known manner by (a) esterification or transesterification of terephthalic acid and/or of the corresponding dialkylterephthalates, preferably the dimethyl ester, with from 1.05 to 5.0 mol, preferably from 1.4 to 3.6 mol of the diol, based on 1 mol of the dicarboxylic acid component, and optionally the branching agent, in the presence of esterification and/or transesterification catalysts (first stage), and (b) polycondensation of the resulting reaction products in the presence of polycondensation catalysts at temperatures between 200° and 320° C. at reduced pressure (preferably below 1 Torr) (second stage).

Both the first step (a) and the second step (b) of condensation are usually carried out in the presence of catalysts, e.g., those described by R. E. Wilfong in J. Polym. Sci. 54, 385 (1961). Some of these catalysts (A) are more powerful accelerators of the esterification reaction (a), others (B) for the polycondensation reaction (b), and still others (C) are fairly active for both (a) and (b)

The following are examples: catalysts (A) which are suitable for accelerating reaction (a):

1. Lithium, sodium, potassium, calcium, strontium and boron in the form of the metals or their oxides, hydrides, formates, acetates, alcoholates, or glycollates;
2. Calcium and strontium chlorides and bromides;
3. Tertiary amines;
4. Calcium and strontium malonates, adipates, benzoates, etc.;
5. Lithium salts of dithiocarbamic acids.

The following are examples of cataysts (B) suitable for the polycondensation reaction (b):

1. Molybdenum, germanium, lead, tin, and antimony in the form of the metals or their oxides, hydrides, formates, alcoholates or glycollates;

2. Zinc and lead perborates and borates;
3. Zinc, manganese(II), cobalt, magnesium, chromium, iron and cadmium succinates, butyrates, adipates or enolates of a diketone;
4. Zinc chloride and bromide;
5. Lanthanum dioxide and titanate;
6. Neodymium chloride;
7. Mixed salts of antimony, e.g., potassium antimony tartrate, and salts of antimonic acids, such as potassium pyroantimonate;
8. Zinc or manganese salts of dithiocarbamic acids;
9. Cobalt naphthenate;
10. Titanium tetrafluoride or tetrachloride;
11. Alkyl ortho-titanates;
12. Titanium tetrachloride ether complexes;
13. Quaternary ammonium salts carrying a titanium hexaalkoxy group; titanium tetraalkoxides, alkali metal or alkaline earth metal compounds of aluminum, zirconium or titanium alkoxides;
14. Organic quaternary ammonium, sulphonium, phosphonium and oxonium hydroxides and salts;
15. Barium malonate, adipate, benzoate, etc.;
16. Lead, zinc, cadmium or manganese salts of the monoalkyl ester of a phenylene dicarboxylic acid;
17. Antimony catechuic complexes with an amino alcohol or with an amine and an alcohol;
18. Uranium trioxide, tetrahalide, nitrate, sulphate or acetate.

The following are examples of catalysts (C) which are suitable for accelerating both steps (a) and (b) of the reaction;
1. Barium, magnesium, zinc, cadmium, aluminum, manganese and cobalt as the metals or their oxides, hydrides, formates, alcoholates, glycolates or preferably, as acetates;
2. Aluminum chloride and bromide;
3. Zinc, manganese(II), cobalt, magnesium, chromium, iron and cadmium succinates, butyrates, adipates, or enolates of a diketone.

The most suitable compounds for use as catalysts (A) are calcium, zinc and manganese salts, particularly the acetates.

The most suitable catalysts (B) are the compounds of zinc, manganese, cobalt, antimony, germanium, titanium and tin, e.g., zinc and manganese acetate, antimony trioxide, trichloride and triacetate, and germanium dioxide and tetrachloride.

The most suitable catalysts (C) are particularly the titanium compounds, e.g. tetraalkyltitanium acid esters having alkyl groups with from 1 to 10 C atoms, such as tetraisopropyltitanate and tetrabutyltitanate.

The catalysts are used in quantities of from 0.001 to 0.2% by weight, based on the dicarboxylic acid components.

Inhibitors may be added in the process to inhibit the catalysts (A) after completion of the first reaction step (a) and to increase the stability of the end product, (cf. "Polyesterfasern" by H. Ludewig, 2nd Edition, publishers Akademie-Verlag, Berlin 1974). The following are examples of such inhibitors: phosphoric acid, phosphorous acid and aliphatic, aromatic and araliphatic esters thereof, e.g. the alkyl esters having from 6 to 18 C atoms in the alcohol component, phenyl esters in which the phenyl groups can carry 1 to 3 substituents having 6 to 18 C atoms, such as trinonylphenyl phosphate, dodecyl phenyl phosphate or triphenyl phosphate. These inhibitors are usually added in quantities of from 0.01 to 0.6% by weight, based on the dicarboxylic acid component.

In order to obtain an even higher molecular weight, the polyalkylene terephthalates may be subjected to a solid phase polycondensation. This is generally carried out by subjecting the granulated product to a temperature which is from 60° to 6° C. below the melting point of the polymer, either in a stream of nitrogen or under a vacuum of less than 1 Torr.

The aromatic acid esters (2) can be prepared by esterification or transesterification of aromatic acids, their anhydrides and/or their dialkyl esters, preferably their methyl esters, with aliphatic, cycloaliphatic, or araliphatic alcohols. A detailed description of the various methods of preparation is in E. Müller, "Methoden der Organischen Chemie" (Houben-Weyl), Vol. 14/2, page 1 et seq., Georg Thieme Verlag, Stuttgart 1963, and in V. V. Korshak and S. V. Vinogradova, "Polyesters", Pergamon Press, Oxford 1965, pages 34–63.

Suitable acids are those in which at least one carboxyl group is directly attached to a carbon atom of an aromatic ring. Included are the phenyl based acids such as benzoic, phthalic, isophthalic, terephthalic and trimellitic acids, the diphenyl based acids such as diphenyl dicarboxylic acid and diphenyl sulfone dicarboxylic acid and the fused ring acids such as the naphthalenic acids like 2,6-naphthalene dicarboxylic acid, in which the acids are either unsubstituted or carry substituents substantially unreactive with high molecular weight polyalkylene terephthalate under injection molding conditions. Also included among the suitable acids are the hydroxy carboxylic acids such as salicyclic and cresotinic acids. Acids of the phthalate or trimellitic families are preferred, i.e. di- and tri-benzoic acids, and phthalic and trimellitic acid are particularly preferred.

Suitable alcohols are those in which at least one hydroxy group is bound to an aliphatically bound carbon atom. Included are the following:

| Monofunctional Alcohols |
| --- |
| methanol | octylbenzylalcohol C$_8$H$_{17}$— 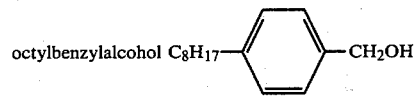 —CH$_2$OH butylalcohol, iso-butylalcohol
2-ethylhexanol
iso-nonylalcohol
n-octylalcohol, iso-octylalcohol
n-decylalcohol, iso-decylalcohol
butoxyethylalcohol CH$_3$(CH$_2$)$_3$—O(CH$_2$)$_2$OH
butoxyethyloxyethylalcohol CH$_3$(CH$_2$)$_3$—O(CH$_2$)$_2$O(CH$_2$)$_2$OH
cyclohexylalcohol
n-hexylalcohol tetrahydrofurfurylalcohol 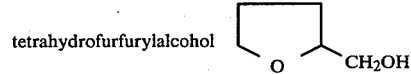

2-butoxyethylalcohol CH$_3$—CH—(OCH$_2$CH$_2$OH)—CH$_2$CH$_3$
ethylalcohol
amylalcohol
n-undecylalcohol
tridecylalcohol
butylbenzylalcohol
methylcyclohexylalcohol
methoxyethylalcohol
benzylalcohol
allylalcohol CH$_2$=CH—CH$_2$OH
hydroabietylalcohol

| Di and Higher Functional Alcohols |
| --- |

-continued ethyleneglycol
propanediol 1,3/1,2
butanediol 1,3/1,4
pentanediol 1,5
hexanediol 1,6
dipropyleneglycol 1,3/1,2
diethyleneglycol
triethyleneglycol
tetraethyleneglycol polyethylene glycol        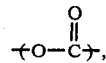 = 400 neopentylglycol HO—CH$_2$—C(CH$_3$)$_2$—CH$_2$OH
glycerol HOCH$_2$—CHOH—CH$_2$OH
trimethylolethane CH$_3$C(CH$_2$OH)$_3$
trimethylolpropane C$_2$H$_5$C(CH$_2$OH)$_3$
pentaerythritol C(CH$_2$OH)$_4$
2,2,4 trimethyl-1,3-pentanediol
sucrose Suitable acids and alcohols are not limited to unsubstituted aromatic or straight or branched aliphatic types respectively, but include those that contain:

(a) residual phenolic OH groups, e.g. cresotinic acid, salicylic acid;
(b) double bonds, e.g., styrenic acid, allylalcohol;
(c) phenyl groups, e.g., octylbenzylalcohol, butylbenzyl alcohol, benzylalcohol;
(d) ether bonds, e.g., diethyleneglycol, dipropyleneglycol, polyethyleneglycol, tetrahydrofurfurylalcohol, butoxyethylalcohol;
(e) thioetherbonds, e.g., 2-hydroxyethyl sulfide, thiodipropanol;
(f) cyclohexyl groups, e.g., cyclohexanol cyclohexanediol, cyclohexanedimethylol; and
(g) halogen atoms, e.g., tetrachlorophthalic acid, tetrachloro terephthalic acid, 3-bromo-2-propanol, 3-chloro-benzylalcohol.

The aromatic acid esters of the present invention are monomeric in the sense that they do not contain repeating structural units connected by the ester linkage

characteristic of polyester oligomers and polymers. They may, however, contain a small number of other repeating linkages such as the ether bond in triethylene glycol. But it is important that these esters are sufficiently compatible with the polyalkylene terephthalate to remain substantially uniformly distributed in the polymer during injection molding. It is believed that it is the ester bonds of these compounds which imparts them with compatibility for the high molecular weight polyester and that, therefore, these compounds should not have too high a proportion of other constituents. Therefore, these esters should not have molecular weights in excess of about 900 and preferably not in excess of about 500.

The permitted ester substituents are "substantially unreactive" with the high molecular weight polyalkylene terephthalate under injection molding conditions in the sense that under such conditions any chemical interaction which may occur does not have a significant effect upon the macroscopic properties of the high molecular weight polyester. For instance, substituents which would cause cleavage of the linkage, $$+O-\overset{\overset{O}{\|}}{C}+,$$

of the high polymer to the extent that its mechanical properties were significantly reduced would be excluded. Also excluded would be substituents which would cause significant cross linking of the high polymer, such as epoxy groups, if more than one were present per molecule of the ester.

Injection molding conditions for polyalkylene terephthalates were well known to those skilled in the art and are taught in U.S. Pat. No. 3,516,957, incorporated herein by reference, and *Injection Molding Theory and Practice*, by Ervin I. Rubin, published by Wiley Interscience, 1972. Generally, these conditions involve temperatures of between about 250° and 310° C., residence times at elevated temperatures of between about 1 and 15 minutes, pressures of up to about 20,000 psi and shear ratios of between about 100 and 10,000 reciprocal seconds. These conditions may also include vacuums of down to 20 inches of H$_9$. Of course, these conditions also include mold temperatures of between about 100° and 200° C. but at these lower temperatures interaction between the high molecular weight polyalkylene terephthalate and substituents of the aromatic acid ester are less probable than at the higher injection temperatures. Naturally suitable substituents need not be "substantially unreactive" at the extremes of these conditions but only for a reasonable portion thereof of the normally encountered range.

The compositions of the present invention find primary utility in injection molding and, therefore, exclude any aromatic acid esters which under such conditions would interact with the high molecular weight polyester to the extent of significantly degrading the polymers mechanical properties. Of course, the tendency of a given ester to cause such results would depend not only upon its inherent chemical activity but also upon its concentration in the composition. Its concentration in the composition would in turn depend upon its effectiveness in promoting more rapid crystallization of the polyester. Therefore, a given ester might be suitable in the compositions of the present invention because at the concentration required for effective acceleration of the crystallization of the high molecular weight polymer it has no significant detrimental effect on the polymer's mechanical properties although at higher concentrations it would have detrimental effects.

Without limiting the generality of the foregoing or being bound to any particular theory of operation, it is believed that the aromatic acid esters of the present invention function to improve, i.e. facilitate, the crystallization of the polyalkylene terephthalate to which they are added by improving the molecular mobility of the polymer chains. In order to do so most effectively, they should meet the following criteria:

(1) They should be sufficiently compatible with the polymer matrix to remain substantially uniformly distributed during customary thermoplastic processing, such as extrusion and injection molding; and (2) They should significantly improve the speed and ease with which the polymer molecules can form themselves into a crystalline array.

Those esters which meet both of these criteria are preferred. These criteria may be simultaneously met by selecting those esters which have a sufficient ester bond content to be compatible with the polyester matrix and yet a high enough carbon content to effect significant enhancement of molecular mobility. Among these esters are believed to be those which have carbon atom to ester bond ratios of no less than about 4, preferably 5, and most preferably 10, and of no greater than 15, preferably 14, inclusive of the carbonyl carbon atom. Therefore, the aromatic acid esters having any of these ratios are particularly preferred.

The following are examples of suitable aromatic acid esters (2): diisopropylphthalate, tri(n-octyl)trimellitate, tri(n-decyl)trimellitate, tri(n-octyl/n-decyl)trimellitate, tri(iso-octyl)trimellitate, tri(iso-decyl)trimellitate, di-tert.-butylphthalate, di-2-ethylhexylphthalate, diisononylphthalate, and di-isononylpoly-triethylene glycol phthalate.

The mixtures of polyalkylene terephthalate (1) and aromatic acid ester (2) can be obtained in usual commercial mixing apparatus such as kneaders and one-shaft or two-shaft screw-extenders. The solidified melt of the mixtures can be granulated for further processing, and this can be followed by a postcondensation in the solid phase.

The compositions of the present invention which include polyalkylene terephthalates based primarily upon ethylene glycol and terephthalic acid may be molded at temperatures of below about 120° C. and still develop sufficient crystallinity to display the superior mechanical and chemical properties which make these resins attractive for injection molded articles. Such polymers typically display maximum heats of crystallization of no more than about 14 cal/g under optimum conditions (high mold temperatures, e.g. above about 140° C., and long residence time in the mold, e.g. in excess of one minute). When used in compositions of the present invention these polymers may be molded under much less favorable conditions (colder molds, e.g. below about 120° C., and shorter residence time in the mold, e.g. less than about 60 seconds) and still display heats of crystallization in excess of about 70% of those obtainable under optimum conditions, e.g. in excess of about 6 cal/g; thus, the present invention includes a process for molding resins based primarily, and preferably solely, upon terephthalic acid and ethylene glycol at mold temperatures of less than about 120° C. while retaining significant crystallinity, preferably more than about 70% of the maximum crystallinity obtainable under optimum injection molding conditions with the polyester alone.

The process comprises intimately blending the terephthalic acid/ethylene glycol based resin and aromatic monomeric carboxylic acid esters and injection molding the composition so prepared into molds held at temperatures less than about 120° C., preferably less than about 110° C. The polyester preferably consists of acid residues of which at least 90 mol % are derived from terephthalic acid and of alcohol residues of which at least 90 mol % are derived from ethylene glycol and most preferably is a homopolyethylene terephthalate. The other components of the polyester may be any of those discussed hereinabove as being suitable. The polyester should have a minimum intrinsic viscosity of about 0.4 dl/g, preferably 0.8 dl/g (measured as a 0.5% strength by weight solution in a phenol/tetrachloroethane mixture in a weight ratio of 1:1 at 25° C.). The aromatic acid ester may be any of those discussed hereinabove as being suitable for enhancing the crystallization of polyalkylene terephthalates. Sufficient aromatic acid ester should be used to permit the retention of a significant degree of crystallization by the polyester when injection molded into molds colder than about 120° C. Preferably no less than about 0.5 wt.%, more preferably no less than about 1 wt.%, most preferably no less than about 4 wt.% of this ester and no more than about 30 wt.%, more preferably 15 wt.%, most preferably 12 wt.%, is used based on the weight of polyester and ester.

In a preferred embodiment of this process aspect of the present invention, the residence time in the mold is significantly less than that required for the unmodified polyester (e.g. pure resin) in making the same part. For small, fairly simple parts this may be less than about 30 seconds, more preferably less than about 20 seconds and most preferably less than 10 seconds as compared to 40 seconds or more for unmodified resin. Adequate crystallinity can be assured under such conditions by using an amount of acid ester sufficient to impart at least 70% of the crystallinity achievable by the pure resin at mold temperatures above about 140° C. and residence times in excess of about 60 seconds. It is particularly desirable to use sufficient ester to impart a heat of crystallization to the molded resin in excess of about 6 cal/g. Of course, significant reductions in the mold residence time of resins modified with conventional additives such as micro talc nucleating agent or glass fiber reinforcing agent are also obtained by further modifying these resins with appropriate amounts of the aromatic esters of the present invention.

The usual quantities of stabilizers, preferably from 0.01 to 0.5% by weight, based on the weight of the polyalkylene terephthalates (exclusive fillers or reinforcements) can be added to protect against thermooxidative degradation. Suitable stabilizers include phenols and phenol derivatives, particularly sterically hindered phenols which have alkyl substituents with 1 to 6 C atoms in both ortho-positions to the phenolic hydroxyl group, amines, preferably secondary arylamines and their derivatives, phosphates and phosphites, preferably their aryl derivatives, quinones, copper salts of organic acids, addition compounds of copper (1) halides with phosphites, e.g. 4,4'-bis-(2,6-di-tert.-butylphenol); 1,3,5-trimethyl-2,4,6-tris-(3,5 -di-tert.-butyl-4-hydroxy-benzyl)-benzene; 4,4'-butylidene-bis-(6-tert.-butyl-m-cresol); 3,5-di-tert.-butyl-4-hydroxybenzyl-phosphonic acid diethyl ester; N,N'-bis-($\beta$-naphthyl)-p-phenylenediamine; N,N'-bis-(1-methylheptyl)-p-phenylenediamine; phenyl-$\beta$-naphthylamine; 4,4'-bis-($\alpha,\alpha$-dimethylbenzyl)-diphenylamine; 1,3,5-tris-(3,5-di-tert.-butyl-4-hydroxy-hydrocinnamoyl)-hexahydro-s-triazine; hydroquinone; p-benzoquinone, toluhydroquinone; p-tert.-butyl-pyrocatechol; chloranil; naphthoquinone; copper naphthenate; copper octoate; Cu-(I)Cl/triphenylphosphate; Cu(I)Cl/trimethylphosphite; Cu(I)Cl/trischloroethylphosphite; Cu(I)Cl/tripropylphosphite; and p-nitrosodimethylaniline. Also suitable as stabilizing agents against molecular weight degradation from hydrolysis are carbodiimides.

The thermoplastic compositions of the invention can be reinforced, e.g. with metals, silicates, carbon and glass, primarily, in the form of fibers and woven or non-woven webs. Glass fibers are preferred.

Inorganic or organic pigments, dyes, lubricants and mold release agents such as zinc stearate, montan wax, UV absorbers and the like can also be added in the usual quantities.

Flame-retardant compositions are obtained by the addition of from 2 to 20% by weight, based on the composition of known flame-retarding agents such as halogen-containing compounds, elementary phosphorus or phosphorus compounds, phosphorus-nitrogen compounds, antimony trioxide or mixtures of these, preferably antimony trioxide, decabromobiphenyl ether and tetrabromobisphenol-A-polycarbonate.

The crystallization velocity of the thermoplastic polyester molding compositions can be further increased by adding nucleating agents in quantities of from 0.01 to 1% by weight, based on the quantity of polyester without filler or reinforcing material. Compounds of this kind are known in the art (cf. Kunststoff-Handbuch, Volume VIII, "Polyester", Carl Hanser Verlag, Munich, 1973, page 701).

The thermoplastic compositions of this invention are suitable for the manufacture of all kinds of molded articles by injection molding and also for the production of films and fibers.

EXAMPLES

An injection mold designed for the production of a gear wheel (diameter 40 mm, thickness 7 mm) was used for determining the length of processing cycle required. The molded product was ejected from the mold by four ejector pins. The minimum injection cycle at which the ejector pins just failed to penetrate the molded product and the product dropped from the mold without difficulty was determined.

Table 1 shows the length of time required in the mold after filling of the mold as well as the total length of the injection molding cycle of some polyester compositions according to the invention based on nucleated polyethylene terephthalate with an intrinsic viscosity of 0.94 in 1:1 phenol/tetrachloroethane at 25° C. and acid esters (Examples 1-5) compared with the corresponding times required for unmodified polyethylene terephthalate (Example 6). Examples 3-4 show the behavior under processing conditions of polyethylene terephthalate mixtures containing phthalic acid esters which have linear aliphatic alcohols as end groups. Although these polyester compositions can be molded to fully crystalline products at a lower mold temperature than pure polyethylene terephthalate, they are not as effective as the esters of Examples 1 and 2 with branched end groups nor the triester of Example 5 as reflected in the fact that the cooling time in the mold and the length of the whole operating cycle is not shortened.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic composition which crystallizes rapidly, comprising
   (a) a high molecular weight polyalkylene terephthalate which has an intrinsic viscosity of at least about 0.4 dl/g (measured as a 0.5% strength by weight solution in a phenol/tetrachloroethane mixture in a weight ratio of 1:1 at 25° C.) and
   (b) about 1.0 to 30% by weight, based on the weight of (a) and (b) of an esterification product of an aromatic carboxylic acid with 7 to 24 carbon atoms and alcohols selected from aliphatic, cycloaliphatic and araliphatic alcohols with 1 to 20 carbon atoms, said esterification product being monomeric and free of substituents substantially reactive with said high molecular weight polyalkylene terephthalate under injection molding conditions.

2. The composition of claim 1, containing at least about 4% by weight of the esterification product, based on the weight of (a) and (b).

3. The composition of claim 1, in which the polyalkylene terephthalate has an intrinsic viscosity of at least about 0.8 dl/g.

4. The composition of claim 1, wherein the esterification product is based on phthalic acid, isophthalic acid, terephthalic acid or trimellitic acid.

5. A process for the production of a composition as claimed in claim 1, in which about 70 to 99% by weight of a high molecular weight polyalkylene terephthalate with an intrinsic viscosity of at least about 0.4 dl/g and about 1.0 to 30% by weight of the esterification product of an aromatic carboxylic acid with 7 to 25 carbon atoms and alcohols selected from aliphatic, cycloaliphatic and araliphatic monohydric and dihydric alcohols with 1 to 20 carbon atoms, said esterification product having a carbon bond to ester bond ratio of between 4 and 14, inclusive, of the carbonyl carbon atom, and being monomeric and free of substitutents substantially reactive with said high molecular weight polyalkylene terephthalate under injection molding conditions are mixed together and homogenized in the melt.

6. A process according to claim 5, in which about 70 to 96% by weight of the polyalkylene terephthalate and about 4 to 30% by weight of the esterification product are mixed together and homogenized in the melt.

7. The process of claim 6, in which at least about 90 mole % the diol component is selected from the group consisting of 1,3-propane diol; 1,4-butane diol; 1,5-pentane diol; 1,6-hexane diol; cyclohexane-1,4-dimethanol and ethylene glycol.

8. A process for increasing the rate of crystallization of a polyethylene terephthalate comprising incorporat-

TABLE 1

| Example | Aromatic acid ester Name | Quantity (% by wt.) | Temperature of cylinder (°C.) | Temperature of mold (°C.) | Cooling time in mold (sec.) | Total injection molding cycle (sec.) |
|---|---|---|---|---|---|---|
| 1 | Di-isononyl-phthalate | 5 | 260 | 107 | 10.0 | 19.5 |
| 2 | Di-isononyl-poly-tri-ethylene-glycol-phthalate | 5 | 260 | 110 | 7.0 | 16.5 |
| 3 | Di-ethyl-phthalate | 5 | 260 | 111 | 40.0 | 49.5 |
| 4 | Di-butyl-phthalate | 5 | 260 | 112 | 35.0 | 44.5 |
| 5 | Tri(n-octyl/n-decyl)mellitate | 10 | 260 | 110 | 0 | 9.5 |
| 6 | — | — | 270 | 140 | 30.0 | 39.5 | ing therein sufficient esterification product of an aromatic carboxylic acid with 7 to 25 carbon atoms and (b) about 1.0 to 30 wt.%, based on the weight of (a) and (b), of an ester of the formula

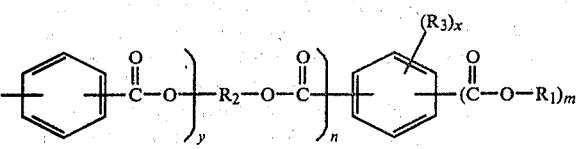

wherein $R_1$ denotes the same or different linear or branched aliphatic, cycloaliphatic or araliphatic $C_1$ to $C_{20}$ hydroxy free residues of monohydroxy alcohols, $R_2$ denotes the same or different linear or branched aliphatic, cycloaliphatic or araliphatic $C_2$ to $C_{20}$ hydroxy free residues of at least dihydroxy alcohols, $R_3$ denotes the same or different monovalent radicals which are substantially unreactive with said polyethylene terephthalate under injection molding conditions, m is an integer of between 0 and 3 inclusive, n is 1 when m is 0 and otherwise is 0, y is an integer of at least 1 and equal to one less than the valence of $R_2$, x is an integer of between 0 and 5 inclusive, the sum of $x+m+n \leq 6$, and z is an integer between 0 and 5 inclusive and alcohols selected from aliphatic, cycloaliphatic and araliphatic alcohols with 1 to 20 carbon atoms, to ensure that said polyester when molded into molds held at a temperature of less than about 120° C. will have at least about 70% of the crystallinity obtainable by injection molding the polyester alone into molds held at temperatures in excess of 140° C. with mold residence times in excess of sixty seconds.

9. The process of claim 8, wherein sufficient esterification product is present to ensure that the polyester will have a heat of crystallization of at least about 6 cal/g as molded into a mold colder than about 120° C.

10. A process for injection molding a thermoplastic polyester comprising
(1) intimately blending
(a) a polyester at least about 90 mol % of whose acid residues are derived from terephthalic acid and at least 90 mol % of whose alcohol residues are derived from ethylene glycol, said polyester having an intrinsic viscosity of at least about 0.4 dl/g in 1:1 phenol/tetrachloroethane at 25° C., with
(b) the monomeric esterification product of an aromatic carboxylic acid having between 7 and 25 carbon atoms with alcohols selected from aliphatic, cycloaliphatic and araliphatic alcohols with between 1 and 20 carbon atoms, said esterification product being free of substituents reactive with said polyester under injection molding conditions, and
(2) injection molding said blend into molds held at temperatures no more than about 120° C.,
a sufficient amount of said esterification product being included in the blend to ensure a significant degree of crystallinity to the molded polyester.

11. The process of claim 10, wherein sufficient esterification product is used to ensure that the molded polyester has no less than about 70% of the crystallinity obtainable by injection molding the polyester alone into molds held at least about 140° C. with residence times of in excess of about 60 seconds.

12. The process of claim 11, wherein the polyester consists essentially of terephthalic acid residues and ethylene glycol residues.

13. The process of claim 10, wherein sufficient esterification product is used to ensure that the molded polyester has at heat of crystallization of no less than about 6 cal/g.

14. In a process for the injection molding of thermoplastic polyesters the improvement comprising
(1) preparing an intimate blend of
(a) a thermoplastic polyethylene terephthalate having an intrinsic viscosity of at least about 0.4 dl/g in 1:1 phenol/tetrachloroethane at 25° C. and having at least about 90 mol % of its acid residues derived from terephthalic acid and 90 mol % of its alcohol residues derived from ethylene glycol, with (2) injection molding said blend into molds held at temperatures of no more than about 120° C., whereby the molded resin has at least about 70% of the crystallinity obtainable by molding the polyethylene terephthalate alone into molds held at no less than about 140° C. with residence times in excess of 60 seconds.

15. The process of claim 14, wherein the polyester consists essentially of terephthalic acid residues and ethylene glycol residues.

16. The process of claim 15, wherein $R_1$ is a $C_3$ to $C_{12}$ branched chain aliphatic residue, and m is 2.

17. The process of claim 15, wherein m is 3.

18. An improved process for forming injection molded articles comprising
(1) intimately blending
(a) a polyester at least about 90 mol % of whose acid residues are derived from terephthalic acid and at least 90 mol % of whose alcohol residues are derived from ethylene glycol, said polyester having an intrinsic viscosity of at least about 0.4 dl/g in 1:1 phenol/tetrachloroethane at 25° C., with
(b) the monomeric esterification product of an aromatic carboxylic acid having between 7 and 25 carbon atoms with alcohols selected from aliphatic, cycloaliphatic and araliphatic alcohols with between 1 and 20 carbon atoms, said esterification product being free of groups reactive with said polyester under injection molding conditions, and
(2) injection molding said blend with mold temperatures less than about 120° C. and with mold residence times significantly less than those required when molding the same part from the polyester alone,
the amount of aromatic acid ester and the residence time being sufficient to ensure at least about 70% of the crystallinity obtainable by molding the polyester alone with mold temperatures no less than about 140° C. and residence times in excess of 60 seconds.

19. A highly crystalline thermoplastic composition which crystallizes rapidly, comprising
  (a) about 70 to 99% by weight of a high molecular weight polyalkylene terephthalate which has an intrinsic viscosity of at least about 0.4 dl/g (measured as a 0.5% strength by weight solution in a phenol/tetrachloroethane mixture in a weight ratio of 1:1 at 25° C.) and
  (b) about 1.0 to 30% by weight of an esterification product of an aromatic carboxylic acid with 7 to 25 carbon atoms and alcohols selected from aliphatic, cycloaliphatic and araliphatic alcohols with 1 to 20 carbon atoms, said esterification product being monomeric and free of substituents reactive with said high molecular weight polyalkylene terephthalate under injection molding conditions and having a carbon atom to ester bond ratio of between 4 and 14 inclusive of the carbonyl carbon atom.

20. A thermoplastic composition which crystallizes rapidly, consisting essentially of
  (a) a high molecular weight polyalkylene terephthalate which has an intrinsic viscosity of at least about 0.4 dl/g (measured as a 0.5% strength by weight solution in a phenol/tetrachloroethane mixture in a weight ratio of 1:1 at 25° C.) and
  (b) about 1.0 to 30% by weight, based on the weight of (a) and (b) of an esterification product of an aromatic carboxylic acid with 7 to 25 carbon atoms and alcohols selected from aliphatic, cycloaliphatic and araliphatic alcohols with 1 to 20 carbon atoms, said esterification product being monomeric and free of substituents substantially reactive with said high molecular weight polyalkylene terephthalate under injection molding conditions.

21. A highly crystalline, rapidly crystallizing thermoplastic composition comprising
  (1) from 70 to 99.5% by weight of a high molecular weight polyalkylene terephthalate having an intrinsic viscosity of at least 0.6 dl/g determined on a 0.5% by weight solution in a mixture of phenol and tetrachloroethane in proportions by weight of 1:1 at 25° C., and
  (2) from 0.5 to 30% by weight of a monomeric phthalic acid ester having no substituents substantially reactive with said high molecular weight polyalkylene terephthalate under rejection molding conditions and represented by the following formula:

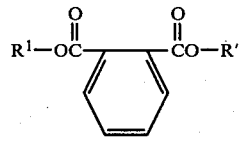

wherein
R$^1$ represents a branched chain aliphatic group having from 3 to 12 C-atoms.

* * * * *